United States Patent
Thompson et al.

(10) Patent No.: US 11,406,068 B2
(45) Date of Patent: Aug. 9, 2022

(54) PLANT COVER WITH INSECT RESISTANT BAG FOR ENCLOSING A PLANT

(71) Applicant: Tree Defender, LLC, Dundee, FL (US)

(72) Inventors: Scott K. Thompson, Winter Haven, FL (US); Thomas A. Thayer, Jr., Winter Haven, FL (US)

(73) Assignee: Tree Defender, LLC, Dundee, FL (US)

( * ) Notice: Subject to any disclaimer, the term of this patent is extended or adjusted under 35 U.S.C. 154(b) by 0 days.

(21) Appl. No.: 17/412,447

(22) Filed: Aug. 26, 2021

(65) Prior Publication Data
US 2021/0378185 A1    Dec. 9, 2021

Related U.S. Application Data

(63) Continuation of application No. 15/359,111, filed on Nov. 22, 2016, now Pat. No. 11,122,752.

(Continued)

(51) Int. Cl.
*A01G 13/10*     (2006.01)
*A01G 13/02*     (2006.01)
(Continued)

(52) U.S. Cl.
CPC ....... *A01G 13/105* (2013.01); *A01G 13/0237* (2013.01); *A01G 13/043* (2013.01); *A01G 17/00* (2013.01); *A01G 2013/046* (2013.01)

(58) Field of Classification Search
CPC ...... A01G 13/04; A01G 13/043; A01G 13/10; A01G 13/105; A01G 13/0237; A01G 17/00; A01G 2013/046

(Continued)

(56) References Cited

U.S. PATENT DOCUMENTS

| 133,099 A | 11/1872 | Miller |
| 614,921 A | 11/1898 | Zimmerman |

(Continued)

FOREIGN PATENT DOCUMENTS

| CA | 2559759 A1 * | 3/2007 | ......... A01G 13/0237 |
| GB | 2098247 | 11/1982 | |

(Continued)

OTHER PUBLICATIONS

Gaire et al. "Individual protective covers (IPCs) to prevent Asian citrus psyllid and Candidatus Liberibacter" www.elsevier.com/locate/cropro' Crop Protection 152 (2022) 105862 pp. 11.

*Primary Examiner* — Ebony E Evans
(74) *Attorney, Agent, or Firm* — Allen, Dyer, Doppelt + Gilchrist, PA (57) ABSTRACT

A plant cover apparatus includes a bag having an interior encompassed by a wall that extends from a top end of the bag and tapers inwardly to a bottom end of the bag. The bottom end includes a rim that laterally circumscribes a plant-receiving opening formed through the bag. The bag has a slot that extends vertically from the opening through the wall. The slot includes opposed margins having cooperatively interlocking parts that can temporarily be joined and separated to increase the size of the opening. The bag may be vertically suspended from a support member positioned next to the plant. An exterior perimeter of the bag may be rigid enough to help the bag maintain its shape when suspended.

24 Claims, 10 Drawing Sheets

Related U.S. Application Data (60) Provisional application No. 62/259,188, filed on Nov. 24, 2015.

(51) Int. Cl.
  *A01G 13/04* (2006.01)
  *A01G 17/00* (2006.01)

(58) Field of Classification Search
  USPC .................. 47/20.1, 29.1, 29.5, 31
  See application file for complete search history.

(56) References Cited

U.S. PATENT DOCUMENTS

| | | | |
|---|---|---|---|
| 633,528 A | 9/1899 | Morris | |
| 1,233,099 A * | 7/1917 | Miller | A01G 13/043 47/23.2 |
| 1,446,416 A | 2/1923 | Curtiss | |
| 1,834,084 A * | 12/1931 | Barnes | A01G 13/04 135/120.1 |
| 1,978,921 A | 10/1934 | Wade | |
| 2,006,562 A | 7/1935 | Scheu | |
| 2,014,175 A | 9/1935 | Hart | |
| 2,097,929 A | 11/1937 | Lovett, Jr. | |
| 2,617,437 A * | 11/1952 | Sherman | A45B 25/18 135/33.2 |
| 2,781,811 A | 2/1957 | Dilar | |
| 2,812,900 A * | 11/1957 | Matthews | F16P 1/02 416/247 R |
| 3,477,453 A * | 11/1969 | Ulisse | E06B 9/52 135/95 |
| 3,490,469 A * | 1/1970 | Dubinsky | A45B 25/24 135/34.2 |
| 3,706,160 A | 12/1972 | Deibert | |
| 3,899,168 A * | 8/1975 | Besherse | A63J 19/00 472/75 |
| 4,054,166 A | 10/1977 | Burke | |
| 4,341,039 A | 7/1982 | Reese | |
| 4,384,604 A | 5/1983 | DeLaura et al. | |
| 4,682,436 A * | 7/1987 | Ritson | A01M 31/025 135/901 |
| D294,538 S * | 3/1988 | De Marr | D21/837 |
| 4,763,440 A * | 8/1988 | James | A01G 13/0206 47/2 |
| 4,787,173 A | 11/1988 | Lewis | |
| 4,799,520 A | 1/1989 | Blackburn et al. | |
| 4,969,555 A | 11/1990 | Fitzgerald | |
| 4,980,991 A | 1/1991 | Kipnees et al. | |
| 5,016,388 A | 5/1991 | Burress et al. | |
| 5,172,712 A * | 12/1992 | Robinson | A45B 25/18 135/33.41 |
| 5,224,967 A | 7/1993 | Rolf et al. | |
| 5,233,788 A | 8/1993 | Jackson, Jr. | |
| 5,291,999 A | 3/1994 | Phair | |
| 5,359,810 A | 11/1994 | Aul | |
| 5,456,043 A | 10/1995 | Dacon, Sr. | |
| 5,590,775 A | 1/1997 | Moore | |
| 5,664,595 A * | 9/1997 | Vonderhorst | A45B 3/00 135/15.1 |
| 5,678,587 A * | 10/1997 | Bilotti | E04H 15/28 135/16 |
| 5,930,948 A * | 8/1999 | Daniel | A01G 13/10 135/900 |
| 6,088,953 A | 7/2000 | Morgan | |
| 6,698,135 B1 | 3/2004 | Robbins | |
| 6,698,440 B2 * | 3/2004 | Beyer | A45B 23/00 135/25.41 |
| 7,497,048 B2 | 3/2009 | Bakowski | |
| 7,637,053 B1 * | 12/2009 | McAnulty | A01G 13/043 47/23.1 |
| 7,866,089 B2 | 1/2011 | Iwig et al. | |
| 8,986,170 B2 | 3/2015 | Sherstnev et al. | |
| 9,215,945 B2 | 12/2015 | PeCoy | |
| 9,462,860 B1 * | 10/2016 | Whetstone, Jr. | A45B 25/18 |
| 9,603,423 B1 * | 3/2017 | Skobeleva | A45F 3/52 |
| D787,283 S | 5/2017 | Horvath | |
| 9,814,188 B2 | 11/2017 | Almudhyan | |
| 9,894,847 B2 * | 2/2018 | Cruz | A01G 13/06 |
| 2003/0009936 A1 | 1/2003 | Hodson | |
| 2004/0040199 A1 | 3/2004 | Thompson et al. | |
| 2005/0086858 A1 | 4/2005 | Schmidt | |
| 2005/0172548 A1 | 8/2005 | Bement | |
| 2006/0059775 A1 | 3/2006 | L'Estrange | |
| 2007/0062171 A1 | 3/2007 | Roberts | |
| 2007/0186466 A1 | 8/2007 | Gardiner | |
| 2010/0154848 A1 * | 6/2010 | Meibos | A45F 3/44 135/16 |
| 2010/0170818 A1 | 7/2010 | Lin | |
| 2010/0172601 A1 | 7/2010 | Lin | |
| 2011/0314731 A1 | 12/2011 | Toye | |
| 2012/0005952 A1 * | 1/2012 | Lohse | A01G 13/043 47/21.1 |
| 2012/0144736 A1 | 6/2012 | Williams | |
| 2013/0219783 A1 | 8/2013 | Toye | |
| 2013/0239472 A1 | 9/2013 | Toye | |
| 2017/0339849 A1 | 11/2017 | Masri | |

FOREIGN PATENT DOCUMENTS

| | | |
|---|---|---|
| GB | 2420262 | 5/2006 |
| JP | H11225591 | 8/1999 |

* cited by examiner

PLANT COVER WITH INSECT RESISTANT BAG FOR ENCLOSING A PLANT

RELATED APPLICATION

This application is based upon prior filed copending application Ser. No. 15/359,111 filed Nov. 22, 2016, which claims priority to U.S. Provisional Application No. 62/259,188 filed Nov. 24, 2015, the subject matter of these applications is incorporated herein by reference in its entirety.

TECHNICAL FIELD

The present disclosure relates to the field of plant cover device, and, more particularly, to insect repelling plant cover devices and related methods.

BACKGROUND

Citrus greening, also known as Huanglongbing (HLB) or yellow dragon disease, is one of the most serious citrus plant diseases in the world because there is currently no cure. The disease has devastated millions of acres of citrus crops throughout the United States and abroad.

Citrus greening disease is spread by a disease-infected insect, the Asian citrus psyllid, and has put the future of America's citrus at risk. Infected trees produce fruits that are green, misshapen and bitter, unsuitable for sale as fresh fruit or for juice. Most infected trees die within a few years.

The Asian citrus psyllid is no bigger than the head of a pin yet has become the most dangerous insect pest to Florida's citrus crops. The infected insect spreads the disease as it feeds on the leaves and stems of citrus trees. Citrus greening disease is further spread by moving infected plants and plant materials.

The disease is typically managed using insecticides to control the psyllid population. Evidence shows that reducing psyllid populations via insecticide application not only slows the rate of HLB spread but also reduces severity of the disease once established.

Young trees that produce multiple flushes throughout the year are at greater risk of greening infection than mature trees because of the attraction of adult psyllids to the new flush. Even without the disease, young trees need to be protected for about four years from psyllids and leaf miners to grow optimally. Soil-applied systemic insecticides provide long lasting control of psyllids, but the chemicals may be environmentally harmful.

Others have developed tree covers that enclose a tree to prevent insect infiltration. Conventional tree covers, however, suffer from one or more drawbacks. The tree cover may rest its weight against the tree, which can damage foliage and branches of young trees. Some tree covers may have a Skelton-like framework that prevents the cover from resting against the foliage, but the framework makes the cover more complicated to install.

SUMMARY

In view of the foregoing, it would be advantageous to have a plant or tree cover system that can cover young trees without resting its weight against the tree's foliage but that also does not require a complicated frame to support the shape of the cover.

Such a plant cover includes a bag made of a plurality of substantially kite-shaped panels attached together along a seam that forms an exterior perimeter of the bag. The bag has an interior encompassed by the substantially kite-shaped panels forming a wall that extends from a top end of the bag and tapers inwardly to a bottom end of the bag. The bottom end includes a rim that laterally circumscribes a plant-receiving opening formed through the bag.

It would also be advantageous to have a plant or tree cover system that can easily be positioned over young trees without damaging the tree's foliage during installation.

Such a plant cover includes a bag having an interior encompassed by a wall that extends from a top end of the bag and tapers inwardly to a bottom end of the bag. The bottom end includes a rim that laterally circumscribes a plant-receiving opening formed through the bag. The bag has a slot that extends vertically from the opening through the wall. The slot includes opposed margins having cooperatively interlocking parts that can temporarily be joined and separated to increase a size of the opening.

DETAILED DESCRIPTION

This disclosure describes example aspects and embodiments, but not all possible aspects and embodiments of the plant cover and related methods. Where a particular feature is disclosed in the context of a particular aspect or embodiment, that feature can also be used, to the extent possible, in combination with and/or in the context of other aspects and embodiments. The plant cover may be embodied in many different forms and should not be construed as limited to only the embodiments described here.

Young citrus trees are at greater risk than mature trees of infection because of frequent leaf flush (fresh growth) which attracts the psyllid as well as many other pests as the young tree grows. The plant cover system described here may advantageously be used to protect young citrus trees for the first three years and beyond after planting. However, it should be recognized that the cover can also be used on a wide variety, size, and age of fruit trees, ornamentals, vegetables, and the like.

It is to be understood that the term "plant" as used herein may include trees. For example "a plant cover" refers to a cover for trees and other plants.

Figure 1:
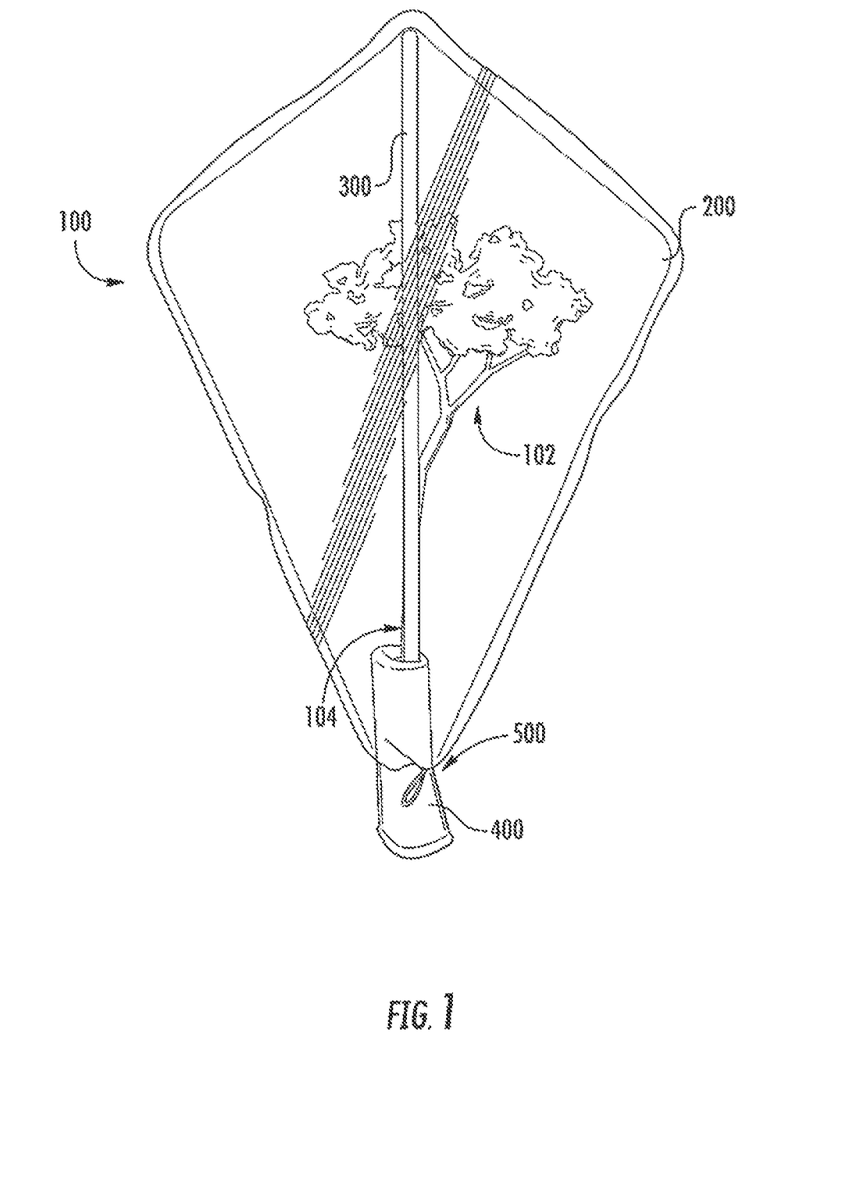
FIG. 1 is a perspective view of a first example of the plant cover system installed so as to enclose a young tree.
Figure 2:
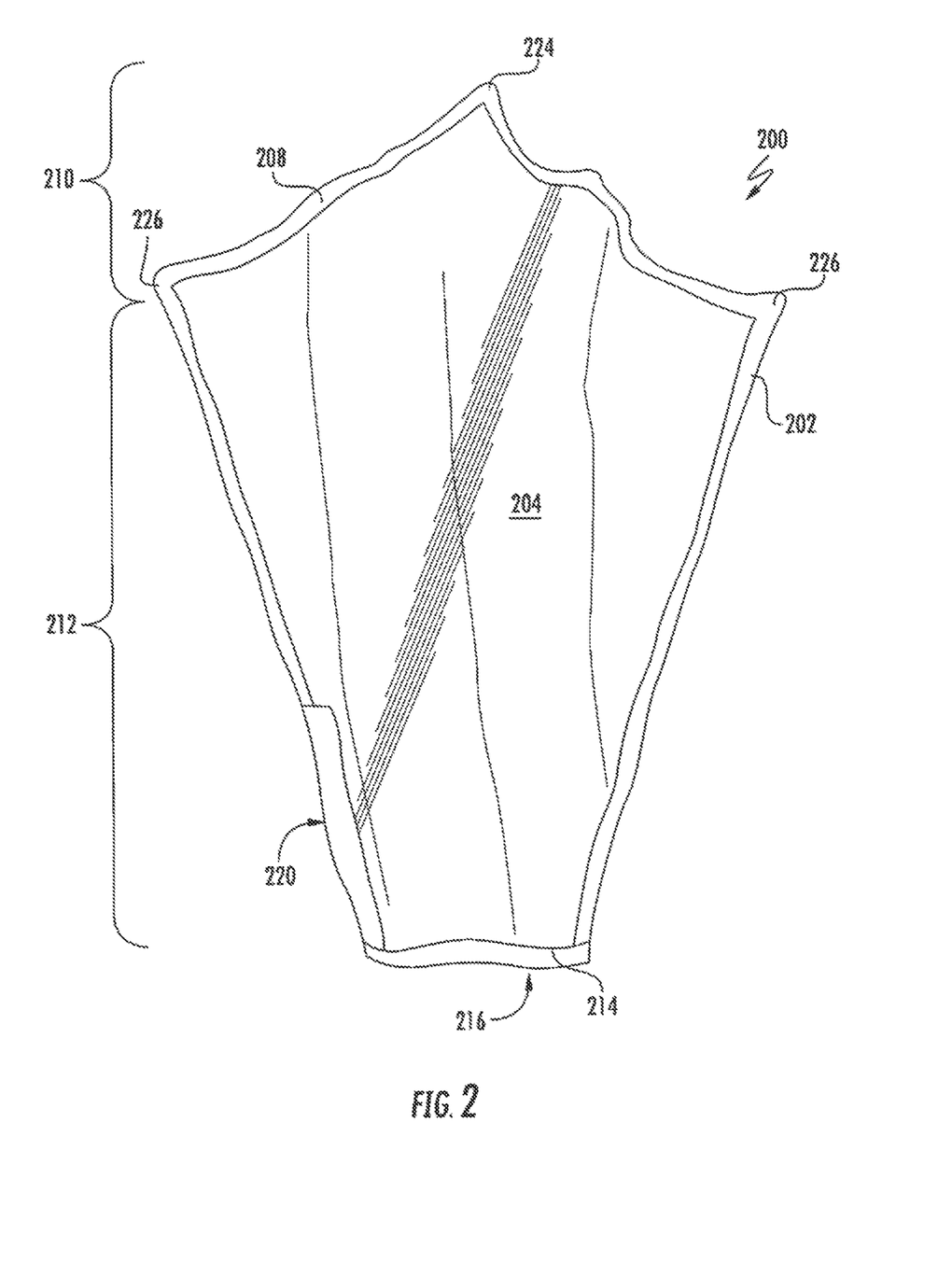
FIG. 2 is a front view of an example of the plant cover bag.
Figure 3:
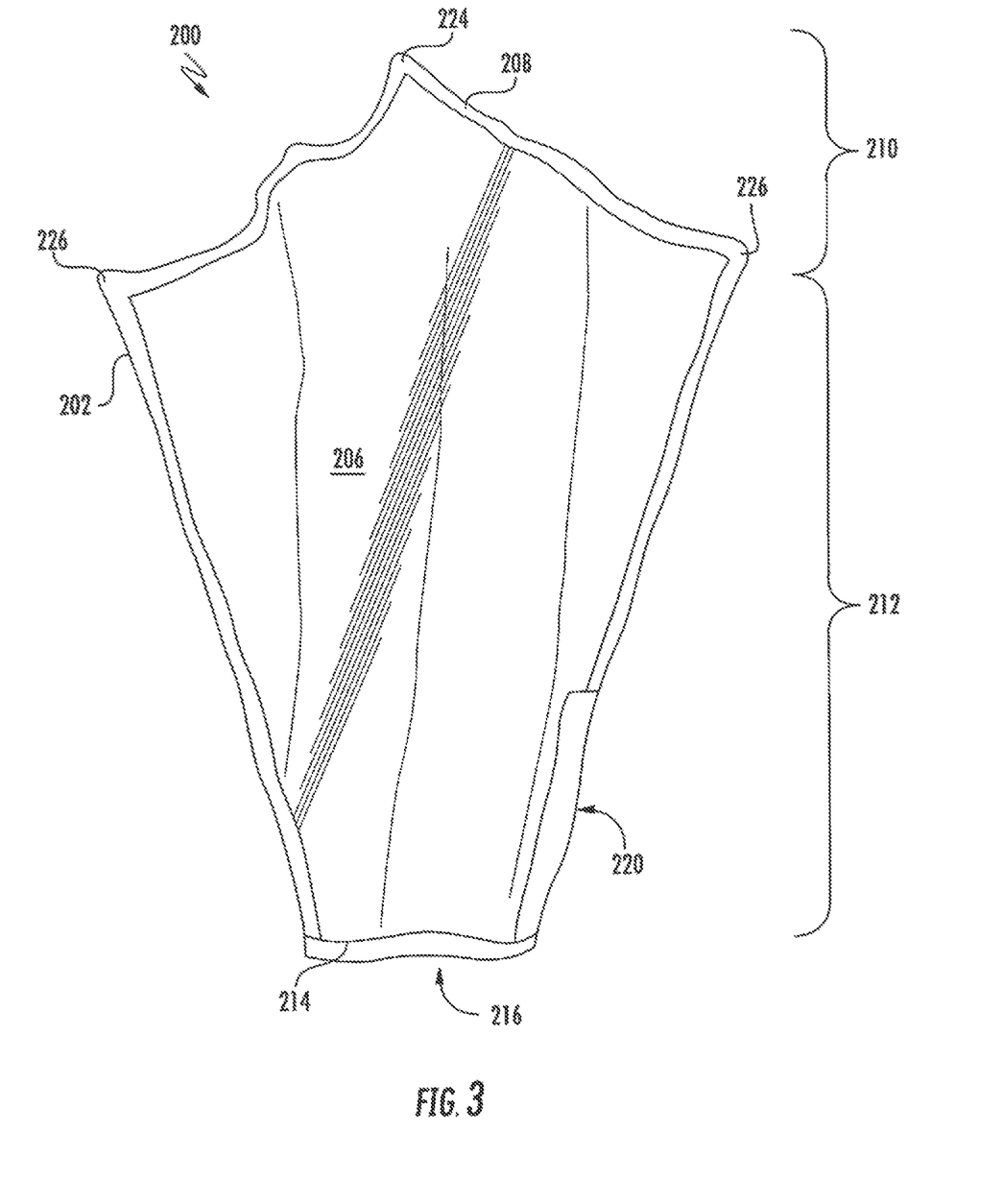
FIG. 3 is a back view thereof.
Figure 4:
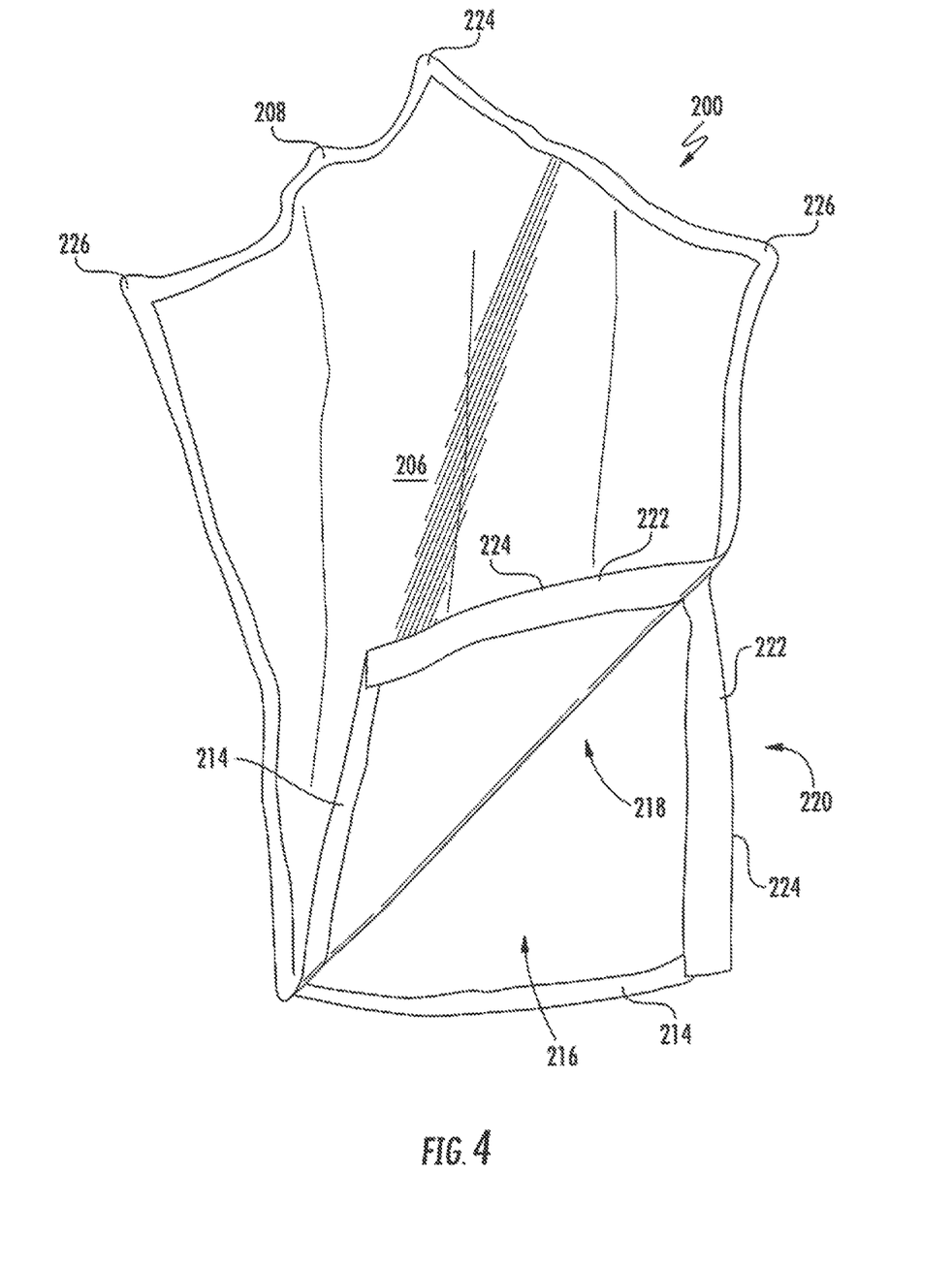
FIG. 4 is another back view of the plant cover bag showing the margins separated to increase the size of the opening.

Referring to FIG. 1, a first example embodiment of the plant cover system 100 includes a plant cover bag 200 upwardly supported by a vertical support member 300 over a tree 102. The bottom of the bag 200 is closed around the trunk 104 of the tree 102. An optional trunk cover 400 encircles the trunk. A closure 500 closes the bottom of the bag 200 around the trunk 104.

Additional details of the bag 200 are now described with reference to FIGS. 2-6.

The bag 200 has a generally kite shaped exterior perimeter 202 and is formed from a first kite shaped panel 204 and a second kite shaped panel that are joined together along a seam 208 forming the exterior perimeter 202 by a conventional joining mechanism such as using an adhesive, sewing, stapling, or the like.

The seam 208 adds rigidity to the exterior perimeter 202, allowing the exterior perimeter 202 to maintain its kite shape without a separate support frame when suspended over a tree. This allows the midsection of the bag 200 to bulge out around the tree's foliage so that the bag 200 does not rest its weight against the foliage.

An upper section 210 of the bag 200 is generally triangle shaped. A lower section 212 of the bag 200 is generally trapezoid shaped. A bottom end of the bag 200 includes a rim 214 that circumscribes an opening 216 to the bag's interior 218.

A slot 220 interrupts the seam 208, extends vertically from the opening 216, and includes a pair of opposed margins 222 that include cooperatively interlocking parts 224 that can temporarily be joined and separated to increase the size of the opening when installing over a plant. The interlocking joining mechanism for the margins 222 may be a hook and loop type closure such as VELCRO, a zipper, or the like. The entire length of the slot 220 may be completely closed to prevent insects from entering through the slot 220.

Figure 5:
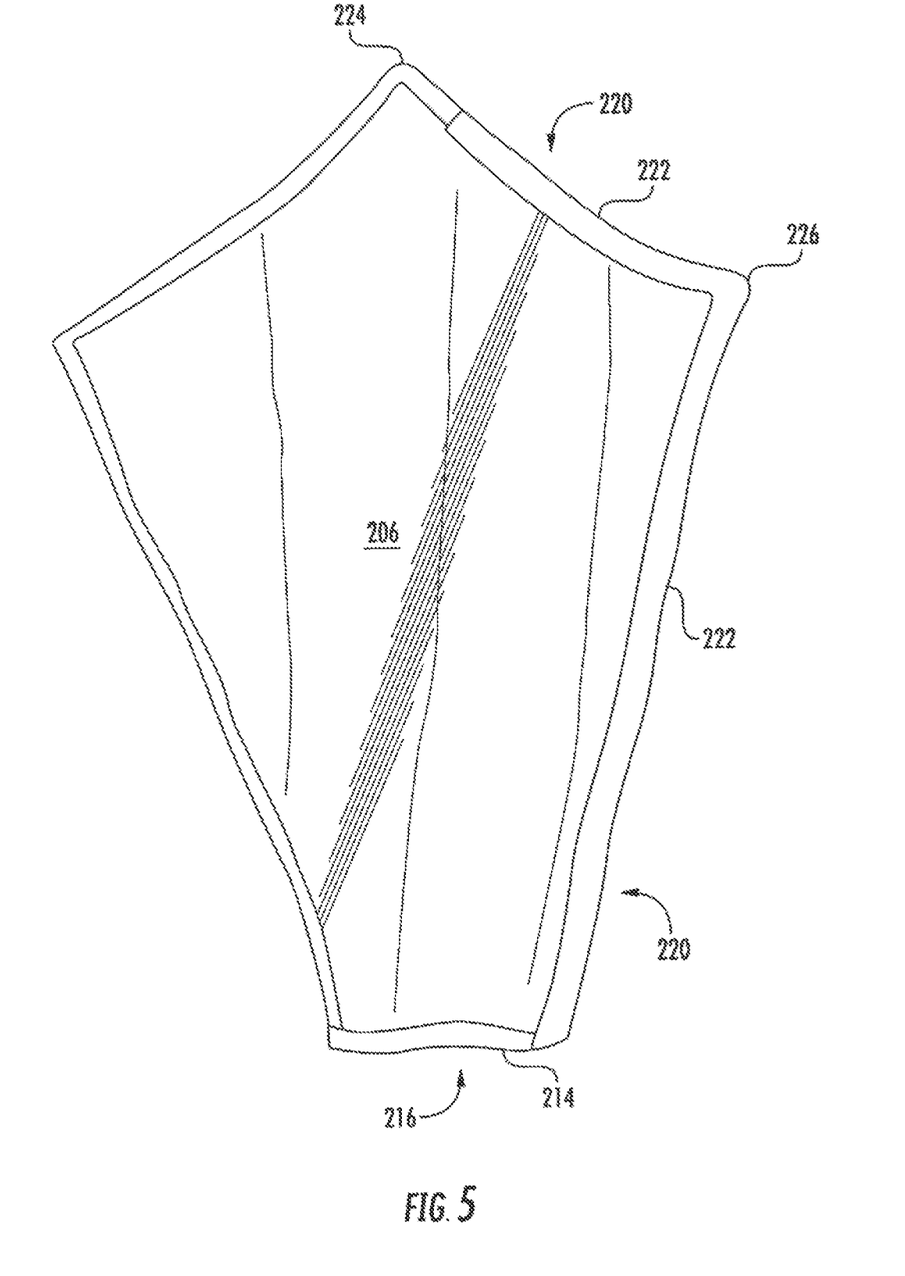
FIG. 5 is a back view of another example of the plant cover bag with a slot that extends to the upper section of the bag.
Figure 6:
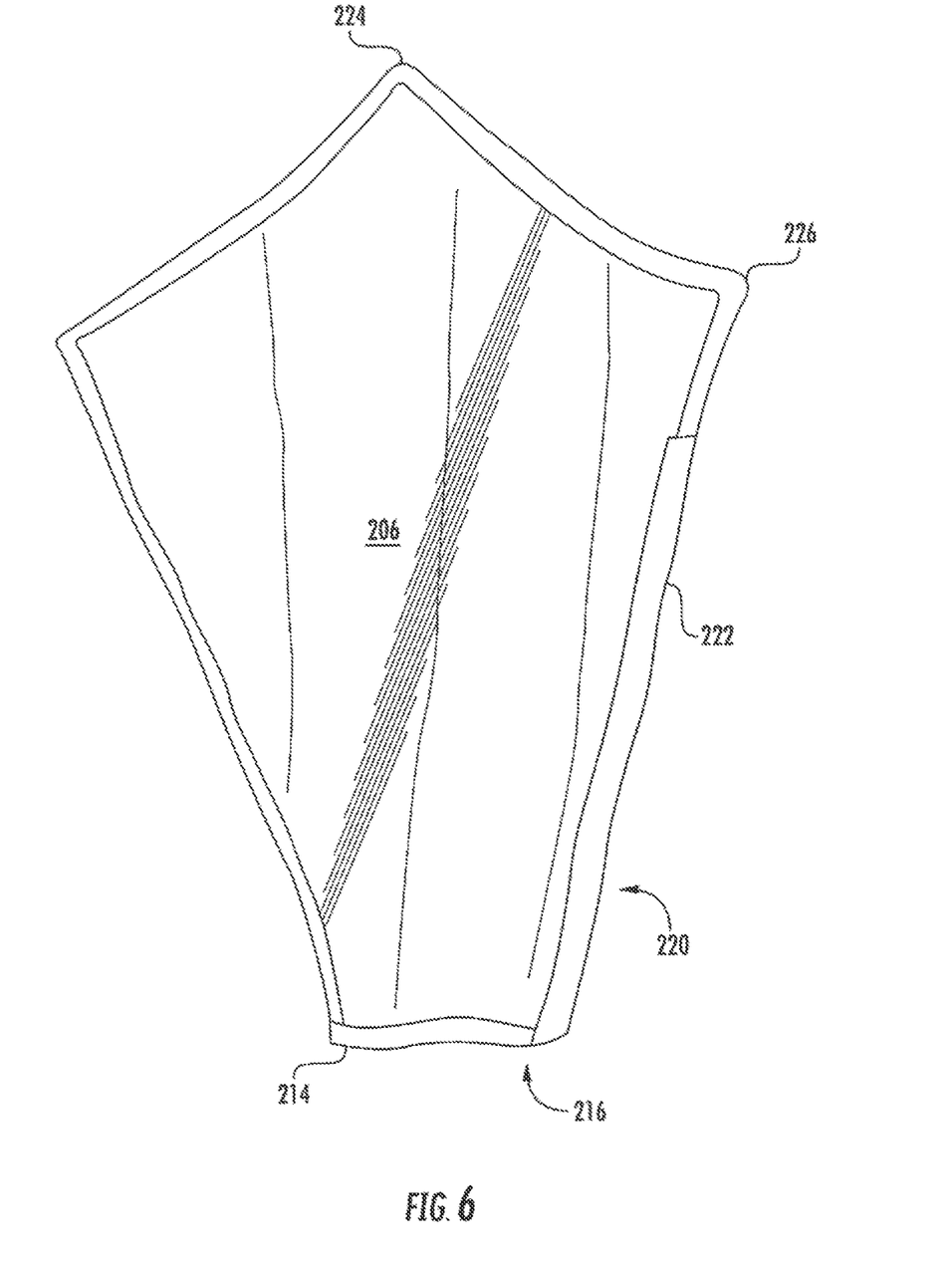
FIG. 6 is a back view of another example of the plant cover bag with a slot that extends closer to the side apex than in the first example.
Figure 7:
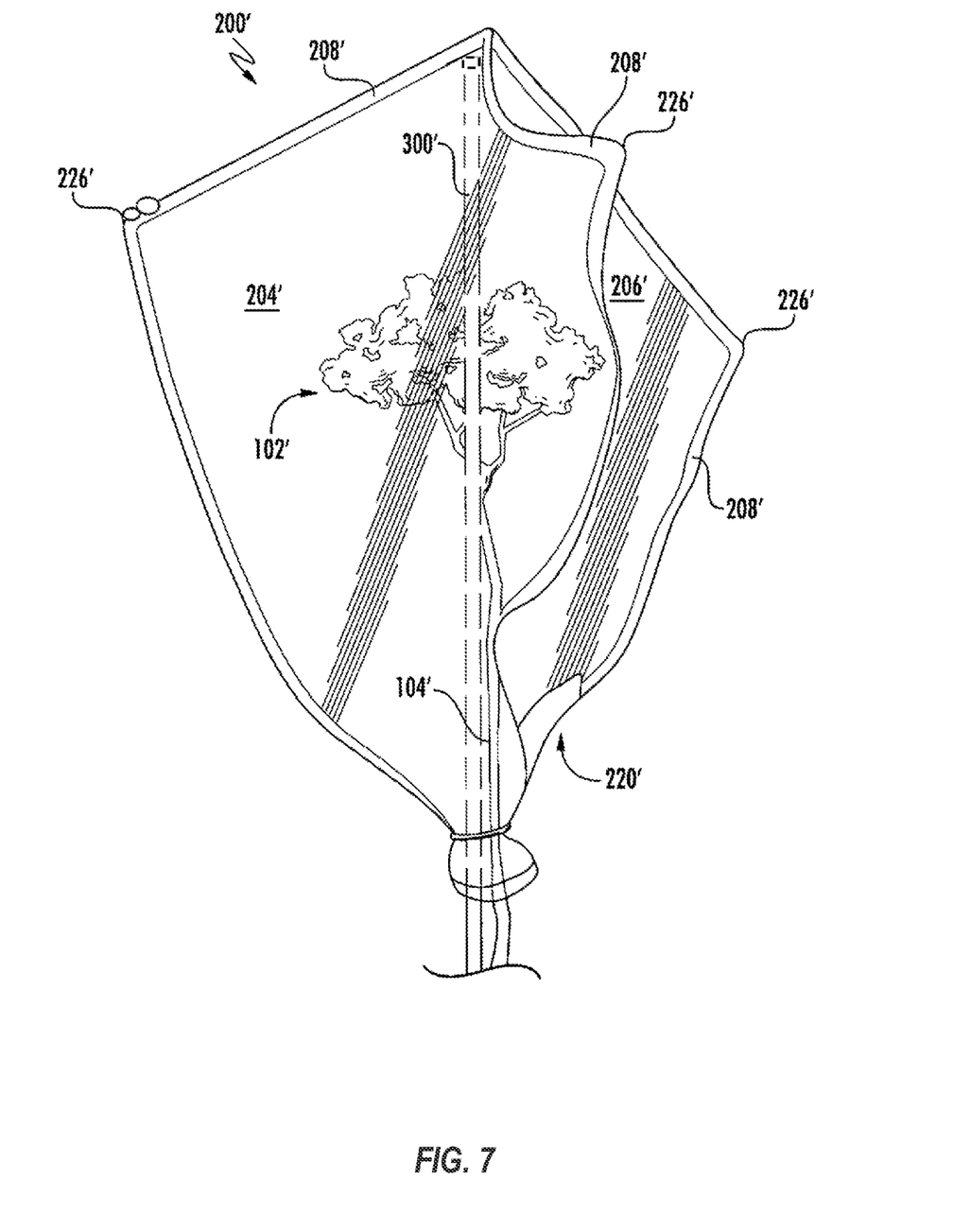
FIG. 7 is a perspective view of a second example of the plant cover system installed so as to enclose a young tree.

Referring to FIGS. 5 and 6, the length of the slot 220 may vary among different examples to accommodate different sizes and shapes of plants and trees. In the example of FIG. 6, the slot 220 extends from the opening 216 to the upper section 210 of the bag 200 and terminates before reaching the bag's top apex 224. In the example of FIG. 7, the slot 220 extends from the opening 216 and part of the way to the side apex 226. If the plant being covered is a fruit or vegetable plant, the extended slot 220 can be opened to harvest the fruits or vegetables from the plant and then closed.

The panels 204, 206 form a wall that encloses the interior of the bag 200. The panels 204, 206 may be made at least partially or completely of a mesh material, which provides water permeability and light transmissivity, but prevents intrusion by small insects such as psyllids. The mesh size may be, for example, 50 mesh or 50 by 25 threads per square inch. Such a mesh size will be sufficient to prevent intrusion by psyllids, aphids, white flies, mealy bugs, leaf miners, thrips, grasshoppers, ants, and orange dogs. The bag 200 may also protect the enclosed foliage from frost, hail, and wind damage.

Figure 8:
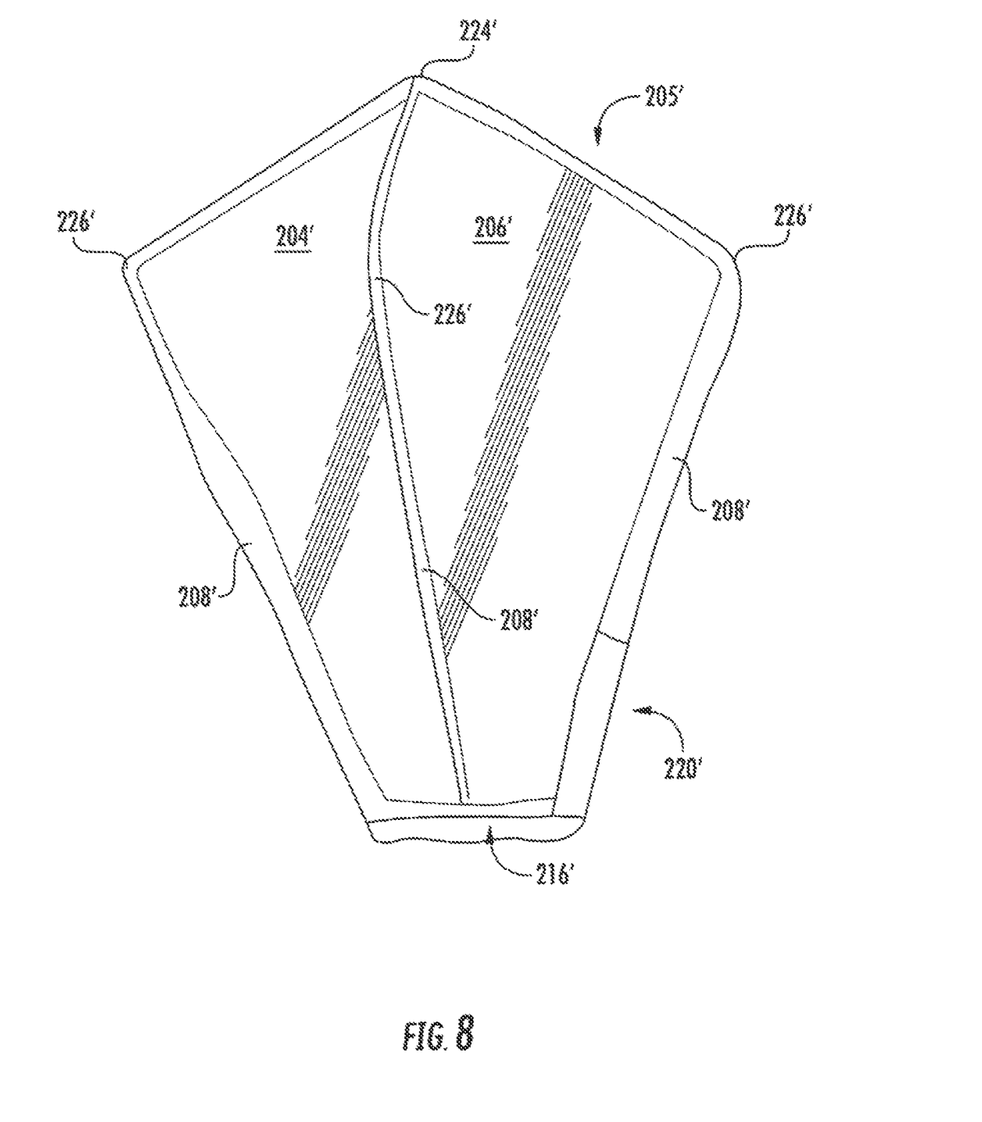
FIG. 8 is a front view of the bag in the second example.
Figure 9:
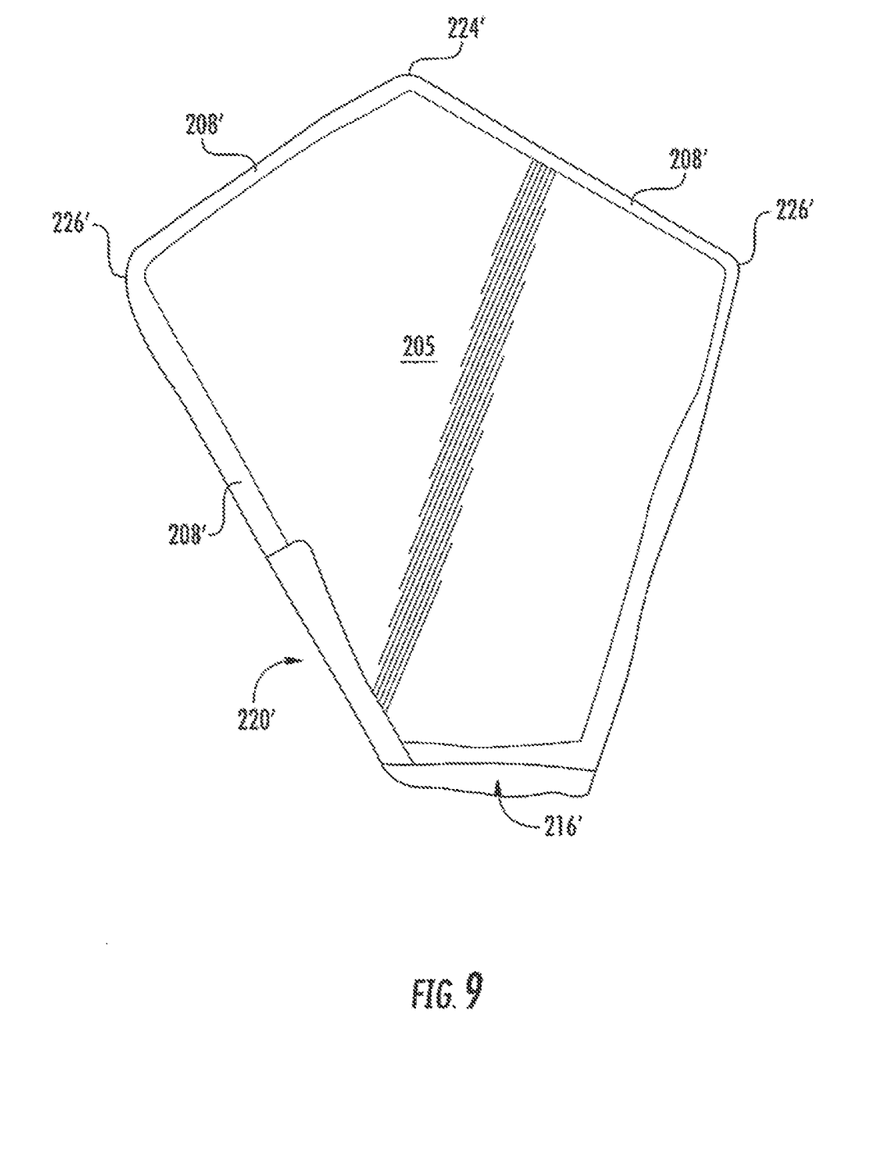
FIG. 9 is a back view thereof.

Referring to FIGS. 7-9 a second example embodiment of the bag 200' includes three kite shaped panels instead of two. In FIGS. 7-9 a prime symbol (') denotes features corresponding to the previous example. The three kite shaped panels 204', 205, and 206' are joined together at the seam 208' so that the bag has three side vertices 226'. This configuration provides more interior volume than in the first example to accommodate larger plants and trees.

Figure 10:
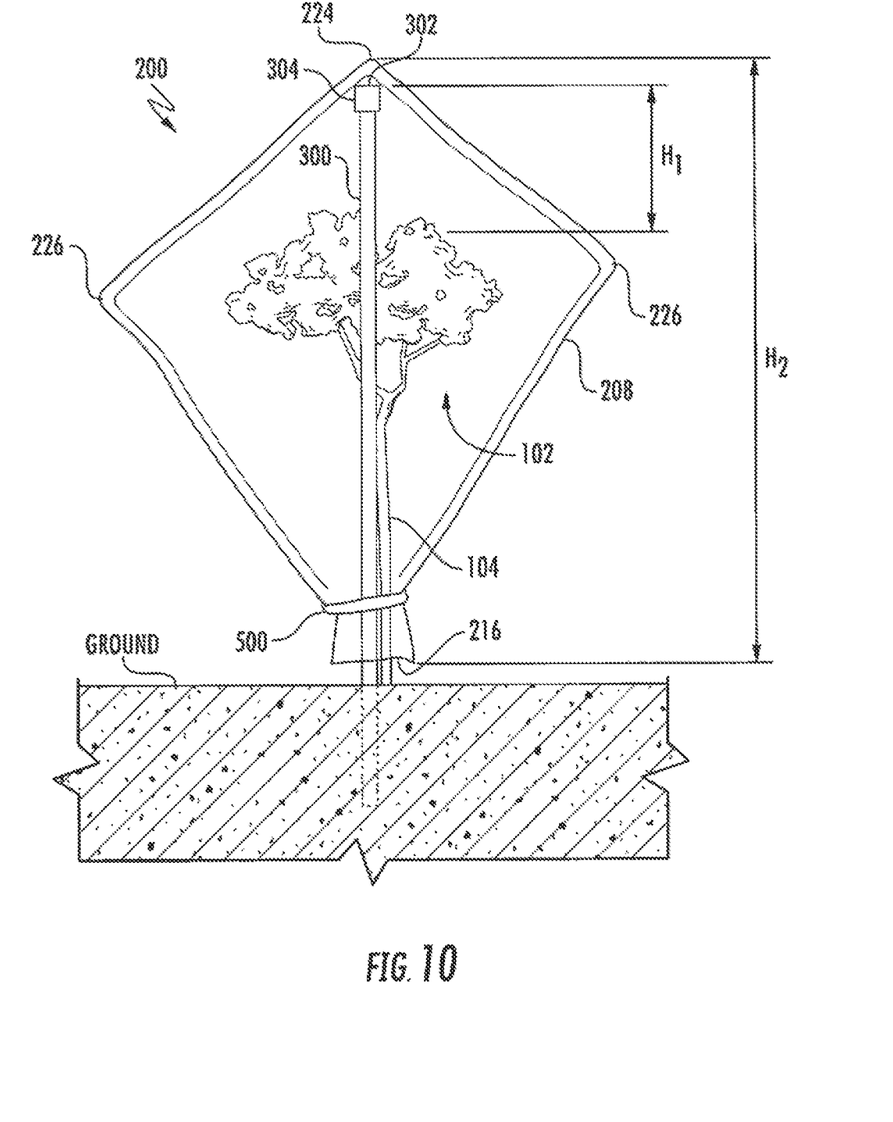
FIG. 10 is a diagrammatic illustration of the first example of the plant cover system enclosing a young tree with the wall of the bag shown as transparent so that the interior of the bag is more clearly visible.

Referring to FIG. 10, the vertical support member 300 may be inserted into the ground like a stake adjacent to the tree 102 so that it extends vertically alongside and in close proximity to the tree 102. The top end 302 upwardly supports the bag 200, keeping the bag 200 from resting on the tree 102 and suspended above the ground. The top of the tree and the top end 302 are offset by a height H1 to allow the tree 102 to grow within the bag 200. The top apex 224 of the bag 200 is positioned atop the top end 302 of the vertical support member 300. The seam 208 provides enough rigidity to the bag 200 to maintain its kite shape. The opening 216 is closed around the trunk 104 of the tree 102 with the closure 500.

The vertical support member 300 may take on many different forms. In the example shown, the vertical support member is a rod-shaped or tubular stake with a plastic or rubber cap 304 on the top end 302 that prevents the vertical support member from causing wear to the bag 200 when the bag 200 moves in the wind, which could generate holes in the bag 200. In other examples, it may include arms extending horizontally from the stake to support the sides of the bag 200 and produce a support frame.

The closure 500 is a string, belt, band, or the like that circumscribes the bag 200 and can be tightened to close the opening 216. The closure 500 may take many different forms such as a drawstring integrally formed with the bag 200, a separate string or rope that can be tied around the bag, a zip or cable tie, a belt, an elastic band, and the like.

The bag's 200 kite shape provides an advantage over other conventional plant covers. The kite shape makes the bag 200 somewhat form fitting to the shape of a tree. It is skinnier at the bottom and top and bulges in the middle to accommodate branches and foliage. The kite shape also provides room for the tree to grow both taller and wider within the bag 200.

The trunk cover 400 encloses the trunk 104 of the tree by encircling it. The trunk cover 400 may be a conventional tubular tree trunk cover or tree trunk wrap. In the example of FIG. 1, the trunk cover 400 has plastic tubular construction and extends from the ground up the trunk. The bag's opening 216 is tightened closed against the trunk cover 400 around the trunk 104. The trunk cover 400 may have a reflective exterior surface. The trunk cover 400 may reduce the amount of pesticides that need to be applied to the tree because it will prevent insect damage.

In an exemplary method of covering a plant using the bag, plant foliage is positioned within the bag 200 by lowering the bag 200 over the plant through the opening 216 in the bag 200. The bag is suspended the bag on a stake positioned next to the plant. The stake extends above the top of the plant. The opening is then closed around a stem or trunk of the plant. To make it easier to position the foliage within the bag 200, the slot 220 may be temporarily opened to increase the size of the opening 216. Once the foliage is within the bag, the slot 220 may then be closed.

The bag 200 is easily removable from the plant or tree when no longer needed even though the plant or tree covered might have grown because the slot 220 can be opened during removal. The bag 200 and vertical support member 300 may then be reused. The bag 200 is lightweight and flexible, allowing for efficient storage and/or shipment. When not in use, the bag 200 may be folded or rolled up for storage.

The scope of the claims is not limited to the only the examples described here. The plant cover system and its components may be embodied in many different forms.

The invention claimed is:

1. A plant cover device comprising:
an enclosure comprising
a plurality of panels coupled together to define a plant-receiving cavity therein, each of the plurality of panels comprising
a major mesh surface, and
a seam extending along a peripheral edge of the major mesh surface, adjacent panels being coupled together at respective seams,
the plurality of panels defining
a first triangle-shaped mesh section, respective seams and adjacent mesh surfaces of the first triangle-shaped mesh section terminating at a sealed top apex,
a second mesh section integral with the first triangle-shaped mesh section, the second mesh section defining a bottom end opposite the sealed top apex, and
a trunk receiving opening at the bottom end, and
a fastener adjacent the peripheral edge of a respective panel and extending from the trunk receiving opening; and
a support extending vertically from a ground surface to abut the sealed top apex of the enclosure.

2. The plant cover device of claim 1 wherein the second mesh section comprises tapering sides.

3. The plant cover device of claim 1 wherein the major mesh surface has a mesh size comprising 50 mesh.

4. The plant cover device of claim 1 wherein the major mesh surface has a mesh size comprising 50 by 25 threads per square inch.

5. The plant cover device of claim 1 wherein the fastener extends partially along the second mesh section.

6. The plant cover device of claim 1 further comprising a closure device wrapped around the enclosure, the second mesh section abutting the support and a trunk of the plant.

7. The plant cover device of claim 1 wherein the fastener comprises a hook and loop fastener.

8. The plant cover device of claim 1 wherein the support comprises a stake, and a cap over the stake, the cap to abut the sealed top apex of the enclosure.

9. The plant cover device of claim 8 wherein the cap comprises one of plastic and rubber.

10. The plant cover device of claim 1 wherein the support comprises a first vertical support extending vertically from the ground surface to abut the sealed top apex of the enclosure, and a plurality of arms extending horizontally from the first vertical support to support the enclosure.

11. A plant cover assembly comprising:
a plant;
a support extending vertically from a ground surface adjacent the plant;
an enclosure to be positioned over the support and the plant, the enclosure comprising a plurality of panels coupled together to define a plant-receiving cavity therein, the plant-receiving cavity receiving the plant, each of the plurality of panels comprising
a major mesh surface, and
a seam extending along a peripheral edge of the major mesh surface, adjacent panels being coupled together at respective seams,
the plurality of panels defining
a first triangle-shaped mesh section, respective seams and adjacent mesh surfaces of the first triangle-shaped mesh section terminating at a sealed top apex to abut the support,
a second mesh section integral with the first triangle-shaped mesh section, the second mesh section defining a bottom end opposite the sealed top apex, and
a trunk receiving opening at the bottom end; and
a fastener adjacent the peripheral edge of a respective panel and extending from the trunk receiving opening.

12. The plant cover assembly of claim 11 wherein the second mesh section comprises tapering sides.

13. The plant cover assembly of claim 11 wherein the major mesh surface has a mesh size comprising 50 mesh.

14. The plant cover assembly of claim 11 wherein the major mesh surface has a mesh size comprising 50 by 25 threads per square inch.

15. The plant cover assembly of claim 11 wherein the fastener extends partially along the second mesh section.

16. The plant cover assembly of claim 11 further comprising a closure device wrapped around the enclosure, the second mesh section abutting the support and a trunk of the plant.

17. The plant cover assembly of claim 11 wherein the fastener comprises a hook and loop fastener.

18. The plant cover assembly of claim 11 wherein the support comprises a first vertical support extending vertically from the ground surface to abut the sealed top apex of the enclosure, and a plurality of arms extending horizontally from the first vertical support to support the enclosure.

19. A method of covering a plant with a plant cover device, the method comprising:
providing a plant cover device and the plant, the plant cover device comprising
an enclosure having a plurality of panels coupled together to define a plant-receiving cavity therein, each of the plurality of panels comprising a major mesh surface, and
a seam extending along a peripheral edge of the major mesh surface, adjacent panels being coupled together at respective seams, the plurality of panels defining
a first triangle-shaped mesh section, respective seams and adjacent mesh surfaces of the first triangle-shaped mesh section terminating at a sealed top apex,
a second mesh section integral with the first triangle-shaped mesh section, the second mesh section defining a bottom end opposite the sealed top apex, and a trunk receiving opening at the bottom end, and a fastener adjacent the peripheral edge of a respective panel and extending from the trunk receiving opening,
positioning a foliage of the plant within the plant cover device by lowering the enclosure over the plant through the trunk receiving opening; and
suspending the enclosure with a support extending vertically from a ground surface to abut the sealed top apex of the enclosure.

20. The method of claim 19 wherein the second mesh section comprises tapering sides.

21. The method of claim 19 wherein the major mesh surface has a mesh size comprising 50 mesh.

22. The method of claim 19 wherein the fastener extends partially along the second mesh section.

23. A method of covering a plant with a plant cover device, the method comprising:
providing the plant cover device with an enclosure comprising
a plurality of panels coupled together to define a plant-receiving cavity therein, each of the plurality of panels comprising a major mesh surface, and a seam extending along a peripheral edge of the major mesh surface, adjacent panels being coupled together at respective seams, and a fastener adjacent the peripheral edge of a respective panel and extending from a trunk receiving opening;

positioning a foliage of the plant within the plant cover device by lowering the enclosure over the plant through the trunk receiving opening; and suspending the enclosure with a support extending vertically from a ground surface to abut a sealed top apex of the enclosure so that the plurality of panels define a first triangle-shaped mesh section, respective seams and adjacent mesh surfaces of the first triangle-shaped mesh section terminating at the sealed top apex, and a second mesh section integral with the first triangle-shaped mesh section, the second mesh section defining a bottom end opposite the sealed top apex, and the trunk receiving opening at the bottom end.

24. The method of claim 23 wherein the support comprises a first vertical support extending vertically from the ground surface to abut the sealed top apex of the enclosure, and a plurality of arms extending horizontally from the first vertical support to support the enclosure.

\* \* \* \* \*